Patented Feb. 26, 1952

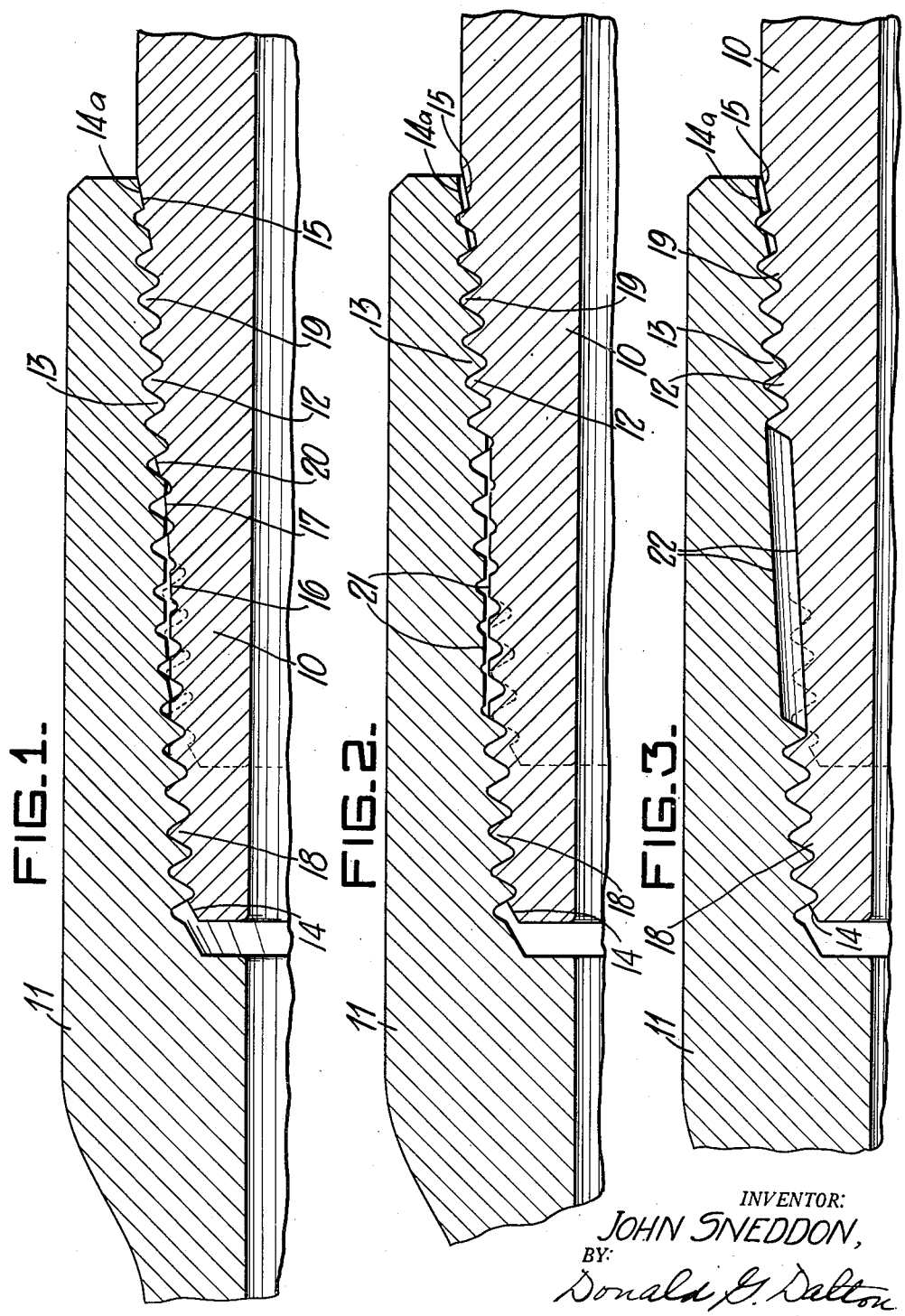

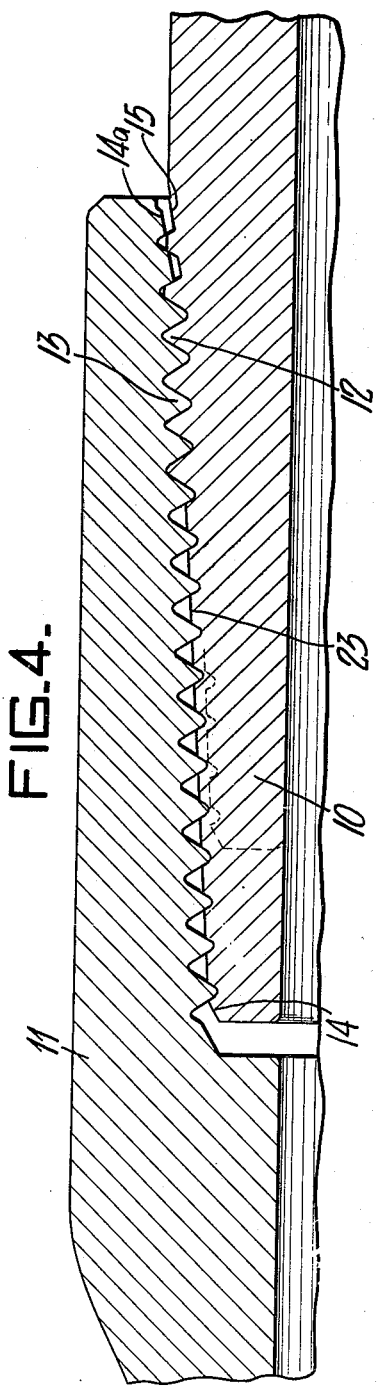
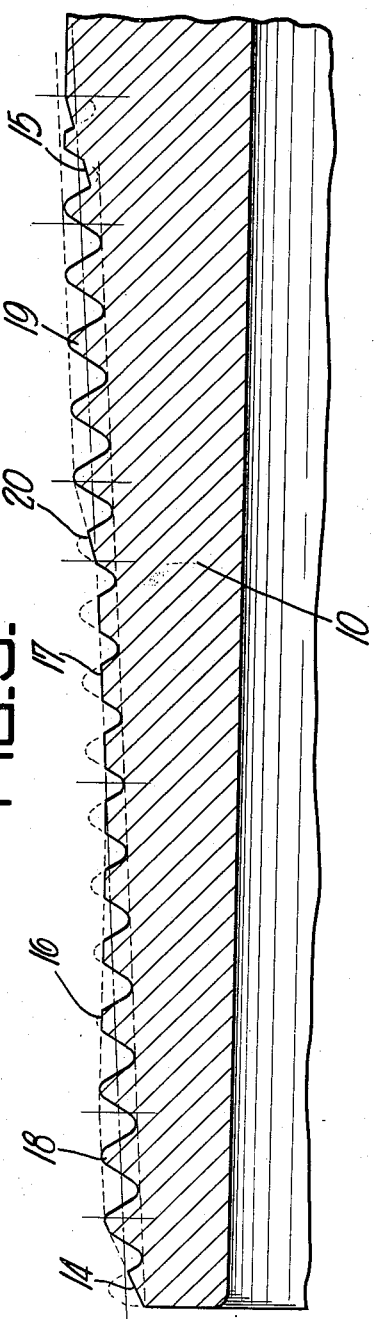

2,587,544

UNITED STATES PATENT OFFICE 2,587,544

THREADED JOINT CAPABLE OF BEING QUICKLY MADE AND BROKEN

John Sneddon, McKeesport, Pa., assignor to United States Steel Company, a corporation of New Jersey Application June 1, 1948, Serial No. 30,252

6 Claims. (Cl. 285—146)

This invention relates to a threaded joint and, in particular, to a joint which may be quickly made and broken and is, therefore, specially adapted for pipe lines which have to be assembled and taken apart from time to time, e. g., strings of drill pipe.

The drilling of deep wells is a practice which is highly developed technically and at the same time very costly. This is especially true in the fields where the oil sands lie at great depths. In those fields, wells are drilled by the rotary drilling method, i. e., a bit is attached to the lower end of a string of drill pipe and the string is rotated, thereby extending the drilled hole to greater depths. Fluids are forced downwardly through the interior of the drill pipe, passing upwardly on the outside thereof, thus removing cuttings from the well as it is drilled and providing lubrication of the rotating string as it turns in the drilled hole. It is obvious that the joints or connections in a string of drill pipe perform a heavy duty and an important function. The weight of the string of drill pipe is supported by the joints and the power to drive the bits is transmitted through the joints. The joints must be fluid tight or leak-proof under large hydraulic heads. Finally it is of prime importance that the joints be so designed and constructed that they may be quickly coupled or uncoupled. In fact, the time required to remove a drilling string may, if excessive, mean the loss of a well.

Drill-pipe joints thus impose perhaps the severest requirements of all applications of threaded joints. Such joints, for the above reasons, must be strong and tight and at the same time must be capable of being made and broken quickly, and these two sets of characteristics are obviously conflicting. Heretofore, joints for drill pipe have been provided with mating male and female portions tapering steeply and having coarse threads of long pitch, to permit "stabbing" or partial telescoping followed by the turning of one member relative to the other, to the extent necessary to complete the telescoping and effect tight engagement of the threads, thus "making" the joint. Joints of the types known previously, however, have only a limited "free stab" or partial telescoping before engagement of the threads, and require a correspondingly large number of turns to "make" the joint.

I have invented a novel threaded joint for general application but particularly adapted for pipe, such as drill-pipe, tool joints, or casing strings or even line pipe or any other application where a joint which can be quickly made and broken is desired. In a preferred embodiment, I provide the tapered mating portions of a telescopic joint with a continuous helical thread and at least partially truncate certain turns thereof in a special manner or remove them to increase the "free stab" and reduce the number of turns of one part of the joint relative to the other, required to make the joint. Specifically, I turn off a portion of the crests of a plurality of adjacent thread turns intermediate the ends of the tapered mating portions. The crests of the truncated turns may be turned off down to a cylindrical surface coaxial with the pipe or a conical surface having the same taper as the pitch cone of the thread, or part of the turns may be turned off down to a cylinder and the remainder to a conical surface. Instead of truncating the turns intermediate the ends of the threaded portions, I may remove them altogether. As a further alternative, I may partly remove the turns on one of the mating portions only, commencing at the outer end, for the greater portion of the threaded length, down to a conical surface coaxial with the pitch cone of the thread and having the same taper.

A complete understanding of the invention may be obtained from the following detailed description and explanation which refer to the accompanying drawings illustrating several preferred embodiments. In the drawings, Figure 1 is a partial axial section through one form of my improved joint;

Figures 2, 3 and 4 are similar views showing modified forms; and

Figure 5 is a diagram showing on an enlarged scale the alteration of the threads of one of the members making up the joint of Figure 1.

Referring now in detail to the drawings and, for the present, to Figure 1, the joint there shown is composed of a male member 10 and a female member 11 having an external thread 12 and an internal thread 13 thereon, respectively. The male member may, for example, be the lower end of a length of drill pipe and the female member, the upper end of the next length therebelow. Alternatively, the male member may be one end of a length of pipe of any kind and the female member one end of a coupling adapted to receive it. The threads 12 and 13 are cut in surfaces originally frusto-conical and extending inwardly from the ends of the members. The two surfaces have the same taper and are coaxial with the members themselves. The threads have their roots in frusto-conical surfaces coaxial with and having the same taper as the original surfaces, before the threads are cut therein.

The thread turns are less than full depth for a short distance at the extreme ends of the frusto-conical surfaces due to the pipe chamfer 14, fadeaway 15 and coupling ream 14ª. Adjacent these portions, the threads 12 and 13 are of full depth. The crests of the thread turns between the full-depth turns adjacent the extreme end portions are truncated or turned down to a cylindrical surface 16 and a frusto-conical surface 17 merging therewith, the threads nearer the outer end being turned off to the cylindrical surface. Figure 5 clearly shows the surfaces 16 and 17 as well as the chamfer and fadeaway portions 14 and 15. The full-depth turns left on the surfaces of the members 10 and 11 adjacent the chamfer or ream and fadeaway portions are indicated at 18 and 19, respectively. Between the frusto-conical surface 17 and full-depth turns 19, there is a short portion 20 of the threaded surface by which the turns gradually increase to full height. The surfaces 16 and 17 on the female member have slightly greater diameters than the corresponding surfaces on the male member.

The increased free stab resulting from the truncation of the turns as described above is indicated by the dotted-line position of the male member 10 at which initial thread engagement occurs. The number of turns necessary to "make" the joint is correspondingly reduced as well as the total time required to make or break the joint. The full-depth portions 18 and 19 insure tight sealing of the joint at both the inner and outer ends of the mating threaded surfaces.

The form of joint shown in Figure 2 is generally similar to that of Figure 1 except that all the thread turns between the full-depth portions 18 and 19 are truncated or turned down to a cylindrical surface 21.

Figure 3 shows a further form of joint in which the turns intermediate the full-thread portions 18 and 19 are removed altogether, being turned down to frusto-conical surfaces 22. All that is required, however, is for the intermediate turns to be turned down to clear the outer full-depth portions of the male and female members as they are stabbed until they engage the inner full-thread portion.

The joint forms shown in both Figures 2 and 3 have all the advantages of that of Figure 1, i. e., increased free stab, reduced number of turns to make the joint and reduced over-all time required to make or break, as well as tight sealing at both ends of the threaded surfaces.

Figure 4 shows a further modification in which the outer end turns as well as the intermediate turns of the thread of one member are turned down to a frusto-conical surface 23. This form has all the aforementioned advantages except that the tight-thread seal will occur at either the inner or outer end of the threaded portion depending on which of the threaded members is truncated. Figure 4 shows the thread truncation on the male member 10 and the thread seal at the outer end of the joint.

The amount of increased free stab obtained depends on the length and depth of truncation for any given length and taper of the threaded portions of the male and female members. In one typical example it was possible to increase the free stab by 47% and to reduce by 50% the turns needed to make the joint. Usually the number of full-depth turns needed to withstand the applied stress will determine the proportion of the total number of turns which may be truncated. The truncating operation is a simple turning job and does not materially increase the cost of the pipe.

Although the invention has been described with particular reference to drill pipe, it is also applicable to pipe of other types, such as casing, tool joints and line pipe, and to threaded joints generally. While only a few embodiments have been disclosed, it will be understood that changes therein may be made without departing from the spirit of the invention or the scope of the appended claims.

I claim:

1. A pipe length including a mating portion at the end thereof having a generally frusto-conical surface with a continuous helical thread extending therearound progressing from one end of said portion to the other, the roots of the thread lying in a frusto-conical surface coaxial with and having the same taper as said first mentioned surface, and a plurality of adjacent turns of said thread less than the total number thereof being at least partially removed, thereby increasing the possible free stab in telescoping a male member into a female member.

2. A pipe length as defined by claim 1 characterized by said turns being at one end of said portion.

3. A pipe length as defined by claim 1 characterized by said turns being intermediate the ends of said portion.

4. A pipe length as defined by claim 1 characterized by the crests of said turns lying in a conical frustum.

5. A pipe length as defined by claim 1 characterized by the crests of said turns lying in a cylinder.

6. A pipe length as defined by claim 1 characterized by said turns being completely removed.

JOHN SNEDDON.

REFERENCES CITED

The following references are of record in the file of this patent:

UNITED STATES PATENTS

| Number | Name | Date |
| --- | --- | --- |
| 1,927,656 | Eaton | Sept. 19, 1933 |
| 2,206,166 | Dunn | July 2, 1940 |